Aug. 20, 1940.                L. W. BARNES                    2,212,223
                             VERTICAL SPINDLE
                            Filed June 4, 1938
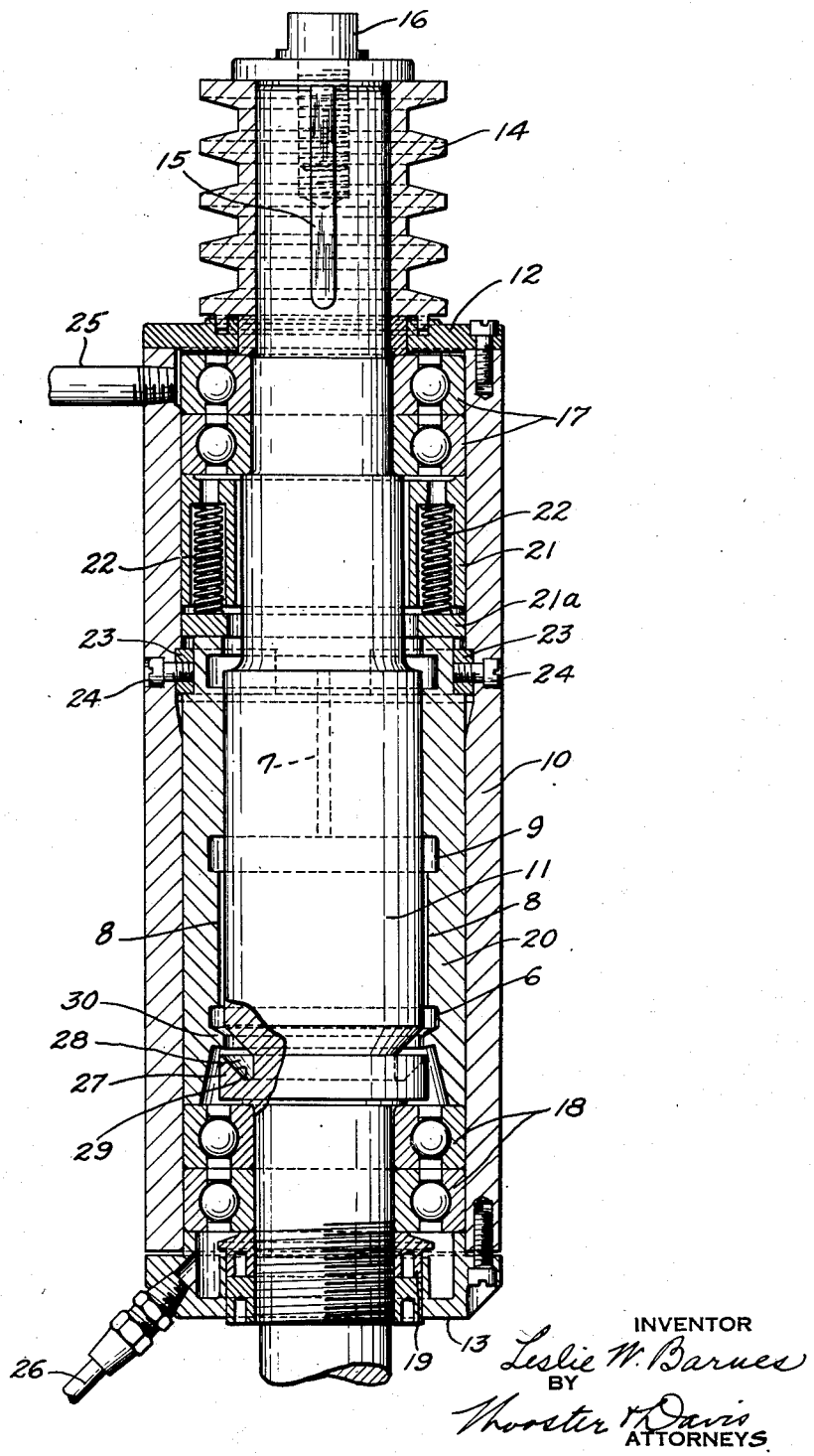
INVENTOR
Leslie W. Barnes
BY
Wooster Davis
ATTORNEYS Patented Aug. 20, 1940

2,212,223

UNITED STATES PATENT OFFICE 2,212,223

VERTICAL SPINDLE

Leslie W. Barnes, Long Hill, Conn., assignor to The Baird Machine Company, Bridgeport, Conn., a corporation of Connecticut Application June 4, 1938, Serial No. 211,787

7 Claims. (Cl. 308—187)

This invention relates to new and useful improvements in vertical spindles and has particular relation to the lubrication of such spindles.

An object of the invention is to provide for the lubrication of the bearing of a vertical spindle immediately on starting of the same following a period of rest.

Other objects and advantages will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the scope of the invention and the appended claims.

In the drawing:

The figure is a vertical sectional view through a vertical spindle made in accordance with the invention.

In vertical spindles, especially high speed vertical spindles such as are often used as grinding wheel spindles running, for example, at speeds as high as 8,000, 9,000 or 10,000 revolutions per minute, when the spindle is allowed to stand idle for some time, say over night, the oil drains out of the bearings and then with the usual constructions when it is started it may run for some time, often as much as a half or full minute or more practically dry, which with such speeds quickly heats up the bearings and may burn them out. I have overcome this difficulty by providing immediately above the lower bearing, or any other bearing from which the oil drains while the spindle is idle and therefore the bearing is apt to be dry when starting the spindle, some means for retaining some oil while the spindle is idle and immediately the spindle is started supplies this oil to the bearing so that it does not run dry for any appreciable time.

Referring in detail to the drawing the vertical spindle shown is adapted to be mounted in a head, frame, or other suitable part of a machine (not shown) and includes an outer sleeve 10 through which extends the spindle per se designated 11. On the upper and lower ends of the sleeve 10 are caps 12 and 13 respectively. While the lower end of the spindle 11, below cap 13, may have a grinding wheel or other tool (not shown) attached thereto, a pulley 14 or other driving means is secured to the projecting upper end of spindle 11 as by a key 15 and bolt 16. The pulley shown is a grooved pulley to be driven by similarly shaped belts from any suitable driving means.

About the upper portion of spindle 11, within the sleeve 10, are a pair of ball bearings 17 while a similar pair of ball bearings 18 are about the lower portion of the spindle at the inner side of the nuts 19. The intermediate portion of the spindle extends through a plain bearing or bushing 20. In the intermediate portion of this plain bearing is an annular groove 9 and the upper and lower portions of the bearing have suitable oil grooves 7 and 8 communicating with the groove 9. The grooves 8 run into a lower annular groove 6. It is preferred that the grooves 7 and 8 be staggered as shown. Above the bushing 20 is the spring retainer 21 mounting any desired number of coil springs 22. Shoulder ring sections 23 at the upper end portion of bushing 20 are secured to the sleeve 10 by screws 24 and secure the bushing in place. It will be seen the springs 22 by pressing upwardly on member 21 retain the upper bearings 17 in proper position and take up for wear and also exert pressure to lift the spindle upwardly and take up the play or wear in bearings 18. This is known in the bearing art as "preloading." At the same time these springs allow for expansion of the bearings as they warm up.

It will be seen that with the construction shown the sleeve 10 is bored straight throughout its length and therefore it is not finished to any shoulder within this bore with consequent difficulty of finishing this shoulder accurately at right angles to the shaft. The ends of the inner bearing or sleeve 20 may be accurately finished at a true right angle to the axis of the shaft thus insuring that the bearings 18 are accurately set at right angles to the shaft. This arrangement makes it much easier to insure that the bearings are properly and accurately positioned relative to the shaft.

When the spindle is stopped for any length of time, as over night, the oil drains out through pipe 26 from the bearings and when the spindle and oil supply are again started the oil must work through the upper bearings 17 and the intermediate bearing 20 before reaching the lower bearing 18. These spindles, especially when used for driving grinding wheels may be operated at relatively high speeds, as for example eight, nine and ten thousand revolutions per minute.

Therefore when the lubricant has drained out of the lower bearings 18, as when the spindle and oil supply have been stopped over night, the spindle when again started may run for a time, as for example for one-half minute or one minute or more in practically a dry condition before the oil reaches bearings 18. This causes the bearings to quickly heat up and may result in their being burned out. The present invention provides means to take care of the mentioned conditions. This is done by providing means above the bearing which will catch and retain oil while the spindle is stationary and then as soon as the spindle is started will supply this oil to the bearing. In the present construction an annular cup-like member 27 is formed on the spindle 11 just above the bearings 18 and provides a groove or oil retainer 28. It is located to collect any lubricant draining down the spindle when the latter is not rotating. The oil groove 28 is open at its upper end and has an outwardly and upwardly inclined lower wall 29. On the lower portion of the bushing 20 is an annular rib or flange 30 overhanging the open upper side of member 27 whereby to make sure that lubricant flowing or draining down the inner face of the bushing is directed into the groove or recess 28.

With this construction when the spindle is stopped lubricant in bearing 18 may drain therefrom and pass out through pipe 26. However, lubricant in the upper bearings and on the upper portions of the spindle will drain into and be retained by the cup-like member 27. Thereafter on starting of the spindle this collected lubricant will be thrown out of the groove by centrifugal action and will immediately run down into and lubricate the bearings 18. Thus such bearing need never run dry for any appreciable length of time. As the spindle is started and the lubricant is thrown from the member 27 a new supply of lubricant is starting through the bearings 17 from the supply pipe 25.

Although the bearings 17 and 18 are shown as ball bearings it will be understood they may be of other types, such for example as roller bearings, and where ball bearings are mentioned this term is used in a generic sense to also include roller and similar bearings.

Having thus set forth the nature of my invention, what I claim is:

1. In combination, a vertical spindle, a bearing for said spindle, means about the spindle above said bearing to collect lubricant draining toward the bearing on stoppage of the spindle, and said means being rotatable with the spindle whereby on starting of the spindle the collected lubricant will be thrown from the means by centrifugal action and will run down to the bearing.

2. In combination, a vertical spindle, a ball bearing about said spindle, a bushing about said spindle above said ball bearing, means for supplying lubricant to the spindle above the bearing, a cup-like means about the spindle above said bearing to collect lubricant draining toward the bearing when the spindle is stopped, means on said bushing for directing toward said cup-like means lubricant draining down the inner face of the bushing, and said cup-like means being rotatable with the spindle whereby on starting of the latter the collected lubricant will be thrown from the cup-like means by centrifugal action and will drain to said ball bearing.

3. In a vertical spindle having spaced upper and lower bearings arranged whereby lubricant supplied to the upper bearing works down to the lower bearing, means about said spindle above said lower bearing to collect lubricant draining toward the lower bearing on stoppage of the spindle, and said means being rotatable with the spindle whereby on starting of the spindle the collected lubricant will be thrown from the means by centrifugal force and will drain to said lower bearing.

4. In combination, a vertical spindle, a bearing for said spindle, a cup-like means about the spindle above said bearing to collect lubricant draining down the spindle when the latter is not rotating, a flange for directing the lubricant into said cup-like means, and said cup-like means being rotatable with the spindle whereby on starting of the latter the collected lubricant will be thrown from the cup-like means by centrifugal force and will drain to said bearing.

5. In combination, a vertical spindle, upper and lower ball bearings about said spindle, a bushing about said spindle between said ball bearings, means about the spindle above the lower ball bearing to collect lubricant draining from the bushing and upper ball bearing when the spindle is stopped, an inner annular flange on said bushing and directing to said means the lubricant draining down the inner surface of the bushing, and said means being rotatable with the spindle whereby on starting of the latter the collected lubricant will be thrown from the means by centrifugal force and will immediately drain to said lower bearing.

6. In combination, a vertical spindle, a bearing about said spindle, an oil groove in the spindle above said bearing to collect lubricant draining toward the bearing when the spindle is stationary, a flange about and independent of the spindle for directing draining lubricant to said groove, and said groove being open at its upper side whereby on starting of the spindle the collected lubricant will be thrown therefrom by centrifugal action and will drain to said bearing.

7. In combination, a vertical spindle, a bearing about said spindle, an oil groove in the spindle above said bearing to collect lubricant draining toward the bearing when the spindle is stationary, and said groove being open at its upper side for the reception of such lubricant and whereby on starting of the spindle the collected lubricant will be thrown from the groove by centrifugal action and will drain to said bearing.

LESLIE W. BARNES.